(12) United States Patent  
Hazen

(10) Patent No.: US 12,686,542 B2  
(45) Date of Patent: Jul. 21, 2026

(54) ANTI-MICROBIAL PACKAGING ASSEMBLY

(71) Applicant: Hazen Paper Company, Holyoke, MA (US)

(72) Inventor: John Hazen, South Hadley, MA (US)

(73) Assignee: Hazen Paper Company, Holyoke, MA (US)

( * ) Notice: Subject to any disclaimer, the term of this patent is extended or adjusted under 35 U.S.C. 154(b) by 76 days.

(21) Appl. No.: 17/220,221

(22) Filed: Apr. 1, 2021

(65) Prior Publication Data

US 2021/0309427 A1 Oct. 7, 2021

Related U.S. Application Data

(60) Provisional application No. 63/004,707, filed on Apr. 3, 2020.

(51) Int. Cl.

| | |
|---|---|
| *B65D 65/40* | (2006.01) |
| *A01N 25/10* | (2006.01) |
| *A01N 25/34* | (2006.01) |
| *A01N 59/20* | (2006.01) |
| *B32B 7/12* | (2006.01) |
| *B32B 15/12* | (2006.01) |
| *B32B 15/20* | (2006.01) |
| *B32B 27/10* | (2006.01) |

(Continued)

(52) U.S. Cl.

CPC ............. *B65D 65/40* (2013.01); *A01N 25/10* (2013.01); *A01N 25/34* (2013.01); *A01N 59/20* (2013.01); *B32B 7/12* (2013.01); *B32B 15/12* (2013.01); *B32B 15/20* (2013.01); *B32B 27/10* (2013.01); *B32B 29/06* (2013.01); *G03H 1/0256* (2013.01); *B32B 2250/03* (2013.01); *B32B 2255/06* (2013.01); *B32B*

*2255/10* (2013.01); *B32B 2255/205* (2013.01); *B32B 2255/26* (2013.01); *B32B 2307/212* (2013.01); *B32B 2307/7145* (2013.01); *B32B 2439/70* (2013.01); *B32B 2439/80* (2013.01); *B32B 2451/00* (2013.01); *B32B 2551/00* (2013.01); *B32B 2553/00* (2013.01); *G03H 2250/39* (2013.01)

(58) Field of Classification Search

CPC .......... B32B 1/02; B32B 27/00; B32B 15/08; Y10T 428/1352; Y10T 428/31678; B65D 88/00  
USPC .................................................. 428/35.7, 688  
See application file for complete search history.

(56) References Cited

U.S. PATENT DOCUMENTS

| | | | | |
|---|---|---|---|---|
| 4,389,438 | A | * | 6/1983 | Ohtsuki .................. B32B 37/02 |
| | | | | 156/334 |
| 4,725,111 | A | * | 2/1988 | Weitzen ............... B42D 25/328 |
| | | | | 430/1 |

(Continued)

FOREIGN PATENT DOCUMENTS

| | | | | |
|---|---|---|---|---|
| CN | 203342078 | U | * | 12/2013 |
| JP | 3296244 | B2 | * | 6/2002 |

OTHER PUBLICATIONS

Transparency, PVC Forum South East Europe, 2010.*

*Primary Examiner* — Humera N. Sheikh  
(74) *Attorney, Agent, or Firm* — Grogan, Tuccillo & Vanderleeden, LLP

(57) ABSTRACT

An anti-microbial packaging includes an innermost decontamination layer defining an inside and exposed surface of the packaging against which items in the packaging would contact. A fiber substrate layer is fixed to the innermost decontamination layer which itself is a metal or a metallic-alloy layer.

11 Claims, 1 Drawing Sheet

(51) Int. Cl.
    *B32B 29/06*         (2006.01)
    *G03H 1/02*         (2006.01)

(56)           References Cited

U.S. PATENT DOCUMENTS

| | | | |
|---|---|---|---|
| 5,031,380 A * | 7/1991 | Ueda | B65B 51/227 |
| | | | 156/272.4 |
| 2004/0018326 A1 * | 1/2004 | Kasahara | B32B 15/12 |
| | | | 428/34.3 |
| 2006/0246149 A1 * | 11/2006 | Buchholz | A61Q 1/02 |
| | | | 424/641 |
| 2007/0034330 A1 * | 2/2007 | Frisk | B29C 65/368 |
| | | | 156/275.1 |
| 2009/0018328 A1 * | 1/2009 | Nagata | C09B 47/0676 |
| | | | 540/127 |
| 2013/0209618 A1 * | 8/2013 | Trombetta | B32B 15/09 |
| | | | 428/35.8 |
| 2015/0024094 A1 * | 1/2015 | Keller et al. | A41B 3/08 |
| | | | 112/475.09 |
| 2017/0252801 A1 * | 9/2017 | Ida | H01B 5/00 |

* cited by examiner

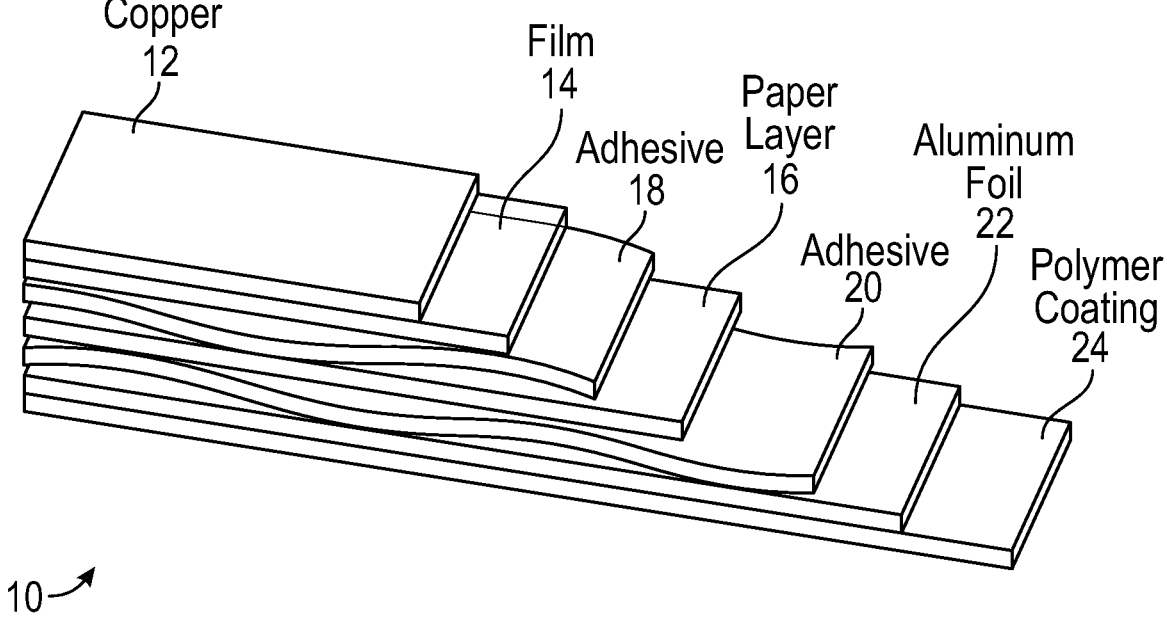

ANTI-MICROBIAL PACKAGING ASSEMBLY

CROSS-REFERENCE TO RELATED APPLICATIONS

This application claims the benefit of U.S. Provisional Application Ser. No. 63/004,707, filed on Apr. 3, 2020, which is hereby incorporated by reference herein in its entirety.

FIELD OF THE INVENTION

This invention relates, generally, to an anti-microbial packaging assembly, and in particular, to an anti-microbial packaging assembly and method of manufacture, that assists in the decontamination and sanitizing of objects placed within the anti-microbial packaging assembly.

BACKGROUND OF THE INVENTION

Modern technology permits greater communication, both of goods and of persons, between all areas of the globe. Part and parcel to this increased communication is that many goods are packaged and shipped across the world, thus there is an obvious concern that contaminating elements—such as bacteria or viruses—may be communicated along with the packaging of such goods.

Of course, while shipped goods certainly raise the specter of contaminants insofar as their packaging is concerned, they are not the only items that may increase the threat of communicating an infection. Indeed, common items such as credit cards, bank cards, driver's licenses and the like are frequently exchanged between individuals, thus potentially leading to the communication of any bacteria or viruses that may be associated with the persons exchanging such items, and/or on the item itself via this exchange.

In view of the above, there is a need for packaging that can adequately effectuate the transport of the goods or item contained therein, but also to do so in a manner that assists in the decontamination of the goods or item itself. It is therefore one object of the present invention to provide a packaging assembly that may effectively assist in the decontamination of an item placed within the packaging.

SUMMARY OF THE INVENTION

According to one aspect of the present invention, the anti-microbial packaging is designed to cause contact between the decontamination layer of the packaging and the object(s) placed therein.

According to another aspect of the present invention, the anti-microbial packaging may include an additional paper layer.

According to yet another aspect of the present invention, the anti-microbial packaging may include an additional metallic layer.

According to yet another aspect of the present invention, the anti-microbial packaging may include an additional polymer outer layer.

According to yet another aspect of the present invention, the anti-microbial packaging may include holographic imaging deposited on one of the layers of the anti-microbial packaging assembly.

According to yet another aspect of the present invention, the anti-microbial packaging may include paper, metallic and polymer layers.

According to yet another aspect of the present invention, the anti-microbial packaging may be used to package food items.

According to yet another aspect of the present invention, the anti-microbial packaging may be used to releasably retain commonly used and exchanged cards, such as credit cards, bank cards, driver's licenses and the like.

These and other uses and advantages are achieved by the present invention.

BRIEF DESCRIPTION OF THE DRAWINGS

FIG. 1 illustrates one embodiment of the anti-microbial packaging of the present invention.

DETAILED DESCRIPTION OF THE PREFERRED EMBODIMENTS

One embodiment of an anti-microbial packaging assembly 10 is shown in FIG. 1. As shown in FIG. 1, the anti-microbial packaging assembly 10 includes a decontamination layer 12. The decontamination layer 12 is designed to be the innermost layer of the anti-microbial packaging assembly 10, such that the decontamination layer 12 may come into touching contact with any item placed within the anti-microbial packaging assembly 10.

As illustrated in FIG. 1, the decontamination layer 12 is preferably formed as a thin deposition of copper, owing to the well-known anti-microbial characteristics of copper and copper-containing alloys. The copper may be included in the anti-microbial packaging assembly 10 as a stand-alone, thin sheet of a copper/copper-alloy metal, or in a preferred embodiment, the copper/copper-alloy may be deposited (via any known process) on a film substrate layer 14, as shown in FIG. 1. The film layer 14, while not required, does provide a certain measure of puncture resistance and stiffness to the overall anti-microbial packaging assembly 10.

It is another aspect of the present invention that that copper/copper-alloy layer may applied via a vacuum deposition process, or alternatively via any other known deposition process, upon a substrate film layer 14.

As also shown in FIG. 1, the decontamination layer 12 and the underlying film substrate 14 are fixed to one side of a paper substrate 16 via a suitable adhesive material/layer 18.

In a preferred embodiment of the present invention, the paper substrate 16 is also provided with a second adhesive material/layer 20 which supports on its opposing side a deposition or thin metallic layer 22, preferably of aluminum.

It is an important aspect of the present invention to note that the metallic layer 22 not only provides a measure of RFID blocking to the anti-microbial packaging assembly 10 as a whole, but may also be utilized for the deposition of any suitable design or adornment, such as holographic imaging or the like. Moreover, the metallic layer 22 may be expressed as a thin-film created through transferred metallization to be as thin as 1 micron, or between 0.000225"-0.004" of deposited aluminum, with or without holographic imaging thereon.

As will be appreciated, the metallic layer 22 acts as a barrier, generally speaking, and could also be composed of another layer of copper or copper-containing alloys.

Returning to FIG. 1, and in a preferred embodiment of the present invention, the decontamination layer 12 may be formed via the vacuum deposition of copper or a copper-alloy on the film layer 14, thus evidencing a thickness of between 300-400 angstroms. The film layer itself is formed from a plastic/polymer film material and may be of any desired thickness, but may be preferably as thin as 0.000225", or as thick as 0.004".

For its part, the paper layer 16 is preferably as thin as typical tissue paper, or as thick as 100 pt multi-ply paper, in dependence upon the nature and purpose of the anti-microbial packaging assembly 10.

As will be appreciated by one of ordinary skill, the paper layer 16 provides a measure of stiffness and machinability to the anti-microbial packaging assembly 10 as a whole. The paper layer 16 may also express tear resistant attributes and characteristics, acting therefore more as a fabric, without departing from the broader aspects of the present invention. The material of the paper layer 16 may itself be impregnated with an anti-microbial agent, without departing from the broader aspects of the present invention.

As a final layer, and especially as it relates to the packaging of various food stuffs, the anti-microbial packaging assembly 10 may also enjoy an outer polymer coating layer 24. This polymer layer 24 can be crafted from any water-repellant and non-porous material without departing from the broader aspects of the resent invention. The polymer layer 24 is preferably transparent or translucent, so that any designs or holographic patterns printed or deposited upon the metallic layer 22 may be easily visible and discernable. As will be appreciated, the polymer layer 24 also provides impact protection to the anti-microbial packaging assembly 10, while also providing external printability and glueability to the anti-microbial packaging assembly 10.

As therefore shown in FIG. 1, and in accordance with one embodiment of the present invention, the anti-microbial packaging assembly 10 preferably contains the following layers: the inner decontamination layer 12 supported on the film 14; the adhesive layer 18; the paper layer 16; the second adhesive layer 20; the metallic film layer 22, and finally, the outer polymer layer 24.

In practice, a laminate construction such as the anti-microbial packaging assembly 10 and shown in FIG. 1 may be formed in any shape or size to accommodate various food items, credit cards, bank cards, driver's licenses or any other object having a surface that may benefit from the sanitizing properties of the present anti-microbial packaging assembly 10.

Once formed into a suitable package, the anti-microbial packaging assembly 10 may releasably house any number of food items, or other objects, such that the exterior of these objects becomes incident upon and in touching contact with the decontamination layer 12, thereby effecting a sanitizing affect upon this outer surface.

While a preferred anti-microbial packaging assembly 10 is shown in FIG. 1, it will be readily appreciated by one of ordinary skill that modifications of the laminate shown in FIG. 1 may be altered, without departing from the broader aspects of the present invention.

In particular, not all of the layers shown in FIG. 1 are necessary in the final laminate, in accordance with the intended use of the same. That is, provided that the anti-microbial packaging assembly 10 includes an inner decontamination layer 12, laminated or supported on any chosen substrate, the exact nature and number of layers is largely driven by manufacturing requirements and the specific items that are intended to be housed within the anti-microbial packaging assembly 10.

Thus, alternative embodiment of the present invention may not include, e.g., the metallic layer 22, or the polymer coating layer 24 or even the film layer 14, without departing from the broader aspects of the present invention. Moreover, other metals besides copper or copper-containing alloys may be used to form the decontamination layer 12, such as the use of silver-based metals, also without departing from the broader aspects of the present invention.

Still yet another preferred embodiment of the present invention lies in the potential differing topographies of the deposited/thin sheet of the decontamination layer 12. Thus, this decontamination layer 12 may be applied so as to evidence a substantially smooth surface, while alternatively, it may be desirable to form the inner decontamination layer 12 instead to evidence a honeycomb pattern.

By way of example, the anti-microbial packaging assembly 10 of the present invention may be crafted as a slim card holder, for use in accommodating credit cards, bank cards, driver's licenses or the like, such that the insert and storage of these items within the anti-microbial packaging assembly 10 facilitates the decontamination of these items, through the physical contact of the inner decontamination layer 12 with the items. Thus, and provided the anti-microbial packaging card holder assembly includes at least the inner decontamination layer 12, any card holder (or, indeed, any other or type of packaging) so manufactured may evidence a paper outer layer, or a polymer outer layer, without departing from the broader aspects of the present invention.

The range of possible packaging that could be advantaged through the use of a decontamination layer such as shown in FIG. 1, is quite large. Indeed, the present invention envisions, e.g., mail envelopes or money holders or card holders, having an inner decontamination layer and an outer bare paper layer, or plastic (film/polymer) coated paper layer. Packaging for food stuffs, or medical or pharmaceutical materials, are also envisioned, and whose application may favor utilizing the outer polymer layer 24 of the present invention. With all potential laminates of the present anti-microbial packaging assembly, it is possible to include one or more metallic layers 22 to provide additional RFID or anti-microbial protection, as well as to support fanciful or decorative holographic (or other) imaging thereon.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. An anti-microbial packaging, comprising:

an innermost decontamination layer having a thickness between 300-400 angstroms, said innermost decontamination layer defining an inside and exposed surface of said packaging against which items in said packaging would contact;

a paper substrate layer fixed to said innermost decontamination layer;

a metallic foil layer on an opposing side of said paper substrate layer from said innermost decontamination layer;

a plastic or polymer film layer disposed between said innermost decontamination layer and said paper substrate layer; and a polymer layer covering said metallic foil layer, said polymer layer being a non-porous material;

wherein each of said innermost decontamination layer, said paper substrate layer, said metallic foil layer, said plastic or polymer film layer, and said polymer layer have a length and width that are coextensive with one another;

wherein said innermost decontamination layer is comprised of one of a metal and a metallic-alloy;

wherein said innermost decontamination layer forms an entirety of said inside and exposed surface of said packaging; and wherein said paper substrate layer is disposed between said innermost decontamination layer and said metallic foil layer.

2. The anti-microbial packaging according to claim 1, wherein:

said metal and said metallic-alloy contains copper.

3. The anti-microbial packaging according to claim 1, wherein:

said metal and said metallic-alloy that form said innermost decontamination layer are deposited on said paper substrate layer.

4. The anti-microbial packaging according to claim 3, wherein:

said metallic foil layer contains one of aluminum and copper.

5. The anti-microbial packaging according to claim 1, wherein:

said paper substrate layer is impregnated with an anti-microbial agent.

6. The anti-microbial packaging according to claim 1, wherein:

said metal and said metallic-alloy that form said innermost decontamination layer contains silver.

7. The anti-microbial packaging according to claim 1, wherein:

said metallic foil layer supports a holographic image thereon.

8. The anti-microbial packaging according to claim 1, wherein:

said polymer layer forms an outer, exposed surface of the anti-microbial packaging such that said metallic foil layer is viewable through said polymer layer from outside said anti-microbial packaging.

9. An anti-microbial packaging, comprising:

an innermost decontamination layer having a thickness between 300-400 angstroms, said innermost decontamination layer defining an inside and exposed surface of said packaging against which items in said packaging would contact;

a substrate layer fixed to said innermost decontamination layer;

a metallic foil layer fixed to an opposite side of the substrate layer from the innermost decontamination layer;

a polymer layer covering said metallic foil layer, said polymer layer being a non-porous material; and a plastic or polymer film layer disposed between said innermost decontamination layer and said substrate layer;

wherein each of said innermost decontamination layer, said substrate layer, said metallic foil layer, said polymer layer, and said plastic or polymer film layer have a length and a width that are coextensive with one another;

wherein said innermost decontamination layer is comprised of copper;

wherein said innermost decontamination layer forms a substantial entirety of said inside and exposed surface of said packaging;

wherein said innermost decontamination layer is a separate and distinct layer from said substrate layer; and wherein said plastic or polymer film layer is a separate and distinct layer from said innermost decontamination layer and said substrate layer.

10. The anti-microbial packaging of claim 9, wherein:

said metallic foil layer comprises at least one holographic image or pattern.

11. The anti-microbial packaging of claim 10, wherein:

said metallic foil layer comprises copper or a copper-containing alloy.

* * * * *